US009692571B2

(12) United States Patent
Wong et al.

(10) Patent No.: US 9,692,571 B2
(45) Date of Patent: Jun. 27, 2017

(54) SIGNALING OF NON-VIRTUAL REFERENCE SIGNALS IN COORDINATED MULTIPOINT COMMUNICATION

(71) Applicants: Alcatel-Lucent USA Inc., Murray Hill, NJ (US); Alcatel Lucent, Boulogne-Billancourt (FR)

(72) Inventors: Shin Horng Wong, Chippenham (GB); Teck Hu, Melbourne, FL (US); Min Zhang, Swindon (GB)

(73) Assignee: Alcatel Lucent, Boulogne-Billancourt (FR)

(*) Notice: Subject to any disclaimer, the term of this patent is extended or adjusted under 35 U.S.C. 154(b) by 268 days.

(21) Appl. No.: 14/458,101

(22) Filed: Aug. 12, 2014

(65) Prior Publication Data
US 2016/0050053 A1 Feb. 18, 2016

(51) Int. Cl.
*H04W 4/00* (2009.01)
*H04L 5/00* (2006.01)

(52) U.S. Cl.
CPC ................... *H04L 5/0051* (2013.01)

(58) Field of Classification Search
CPC .............................. H04B 7/024; H04W 16/04
See application file for complete search history.

(56) References Cited

U.S. PATENT DOCUMENTS

| | | | | |
|---|---|---|---|---|
| 2008/0134194 A1* | 6/2008 | Liu | ........................ | H04W 16/04 718/105 |
| 2012/0294694 A1* | 11/2012 | Garot | ...................... | F27D 1/141 411/427 |
| 2013/0003668 A1* | 1/2013 | Xiao | ........................ | H04L 5/001 370/329 |
| 2013/0301447 A1* | 11/2013 | Gomadam | ............ | H04W 24/10 370/252 |
| 2014/0334402 A1* | 11/2014 | Chen | ...................... | H04L 5/0035 370/329 |
| 2015/0163687 A1* | 6/2015 | Lee | ........................ | H04W 24/10 370/252 |

\* cited by examiner

*Primary Examiner* — Kevin C Harper
(74) *Attorney, Agent, or Firm* — Davidson Sheehan LLP

(57) ABSTRACT

A first cell transmits a virtual cell identifier and state information associated with the virtual cell identifier over an interface to a second cell. The first cell and one or more third cells use the virtual cell identifier for transmissions to first user equipment. The state information indicates one of a plurality of states that indicate whether the virtual cell identifier is associated with at least one non-virtual reference signal for the first cell, the second cell, or one or more third cells. The second cell receives the virtual cell identifier and the state information and transmits the virtual cell identifier and state information over an air interface to second user equipment served by the second cell. The second user equipment performs interference cancellation or suppression of transmissions to the first user equipment based on the virtual cell identifier and the state information.

31 Claims, 5 Drawing Sheets

SIGNALING OF NON-VIRTUAL REFERENCE SIGNALS IN COORDINATED MULTIPOINT COMMUNICATION

BACKGROUND

Field of the Disclosure

The present disclosure relates generally to wireless communication systems and, more particularly, to coordinated multipoint communication in wireless communication systems.

Description of the Related Art

User equipment can improve downlink throughput by canceling or suppressing interference caused by downlink signals transmitted to other user equipment by neighboring cells. The user equipment can demodulate the downlink signals based on reference signals included in the downlink signals and then remove the demodulated signals from the signals received by the user equipment. Examples of reference signals include cell-specific reference signals (CRS) that are derived from a physical cell identifier of the transmitting cell, channel state information reference signals (CSI-RS) that are configured by the transmitting cell, and demodulation reference signals (DMRS) that are derived from a cell identifier such as the physical cell identifier. The reference signals for neighboring cells can be transmitted to user equipment by the user equipment's serving cell. For example, each cell may receive information identifying the configuration of reference signals for a set of neighboring cells over an interface such as a backhaul interface and may transmit information identifying the reference signals to user equipment when the user equipment connects to the serving cell, e.g., by handing off to the serving cell. The interfering cell reference signals that are signaled to the user equipment by its serving cell are a subset of the parameters used in network-assisted interference cancellation and suppression (NAICS).

Wireless communication systems may implement coordinated multipoint (CoMP) communication that allows user equipment to receive signals from its serving cell and one or more other cells using a virtual cell identifier instead of the physical cell identifier that identifies its serving cell. User equipment can be configured with one or more virtual cell identifiers and different cells can use the virtual cell identifiers to transmit to the user equipment. For example, a virtual cell identifier can be assigned to a first cell and a second cell and the virtual cell identifier can be provided to user equipment, which may be attached or connected to the first cell. Either the first cell or the second cell may then transmit signals to the user equipment using the virtual cell identifier. In some cases, both the first cell and the second cell may concurrently transmit signals to the user equipment using the virtual cell identifier. The transmitting cell or cells may change from subframe to subframe. Transmission by the first or second cells is transparent to the user equipment because the user equipment does not need to know the source of the signal. Reference signals such as the DMRS may be derived from the virtual cell identifier and user equipment may use the DMRS to demodulate the signals transmitted to the user equipment by the first or second cells using the virtual cell identifier. However, other (non-virtual) reference signals such as the CRS and CSI-RS are not derived from the virtual cell identifier and may therefore be different for the first cell and the second cell.

User equipment can identify the non-virtual reference signals (such as the CRS and CSI-RS) using a mapping between the virtual cell identifier and the non-virtual reference signals. For example, a quasi-co-location indicator can be used to inform user equipment that different cells are co-located. The user equipment can use the non-virtual reference signals from one of the co-located cells in combination with virtual reference signals (such as the DMRS) to demodulate downlink signals transmitted by other co-located cells. However, in CoMP communication, not all of the cells associated with a virtual cell identifier are necessarily co-located and consequently the virtual cell identifier does not uniquely indicate the non-virtual reference signals that should be used by user equipment to demodulate downlink signals from cells associated with the virtual cell identifier. The mapping of the virtual cell identifier to the non-virtual reference signals may therefore be implemented as a static mapping between the non-virtual reference signals and a dynamic mapping between the virtual cell identifier and one of the non-virtual reference signals. For example, the static mapping may indicate different combinations of a CRS and a CSI-RS for the cells associated with the virtual cell identifier and the dynamic mapping may indicate which combination is associated with the virtual cell identifier during the current subframe. The static mapping may be provided to the user equipment at connection, e.g., using radio resource control (RRC) signaling of information transmitted over a backhaul interface, and the dynamic mapping may be provided to the user equipment in the downlink control information (DCI) transmitted in the subframe that includes the non-virtual reference signals. Thus, the dynamic mapping may change from subframe to subframe.

The virtual cell identifier can be transmitted over a backhaul interface to neighboring cells so that user equipment connected to the neighboring cells can identify the virtual reference signals for interference suppression or cancellation. However, transmitting the dynamic mapping over the backhaul interface is impractical because the delays in the backhaul interface are typically long relative to the duration of a subframe. Thus, user equipment may be limited to demodulating interfering signals using virtual reference signals such as the DMRS during CoMP communications. Although this may be sufficient for interference suppression or cancellation for relatively large transmissions that include the DMRS in three or more physical resource blocks (PRBs) of the subframe, it is not sufficient for smaller transmissions of one or two PRBs in the subframe. One proposal is to remove the need for dynamic mapping by requiring that a virtual cell identifier be associated with a single set of non-virtual reference signals that can be specified by the static mapping. However, this limits the flexibility of CoMP communication provided by the virtual cell identifiers.

SUMMARY OF EMBODIMENTS

The following presents a summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

In some embodiments, a method is provided for signaling non-virtual reference signals in coordinated multipoint communication. The method includes transmitting, over an interface from a first cell to a second cell, a virtual cell identifier and state information associated with the virtual cell identifier. The first cell and one or more third cells use the virtual cell identifier for transmissions to first user equipment. The state information indicates one of a plurality of states that indicate whether the virtual cell identifier is associated with one or more non-virtual reference signals for the first cell, the second cell, or the one or more third cells.

In some embodiments, a method is provided for signaling non-virtual reference signals in coordinated multipoint communication. The method includes receiving, from a first cell at a second cell over an interface, a virtual cell identifier and state information associated with the virtual cell identifier. The first cell and one or more third cells use the virtual cell identifier for transmissions to first user equipment. The state information indicates one of a plurality of states that indicate whether the virtual cell identifier is associated with one or more non-virtual reference signals for the first cell, the second cell, or the one or more third cells. The method also includes transmitting the virtual cell identifier and state information over an air interface to second user equipment served by the second cell.

In some embodiments, a method is provided for signaling non-virtual reference signals in coordinated multipoint communication. The method includes receiving, at first user equipment from a first cell over an air interface, a virtual cell identifier and state information associated with the virtual cell identifier. A second cell and one or more third cells use the virtual cell identifier for transmissions to second user equipment. The state information indicates one of a plurality of states that indicate whether the virtual cell identifier is associated with one or more non-virtual reference signals for the first cell, the second cell, or the one or more third cells. The method also includes modifying operation of the second user equipment based on the virtual cell identifier and the state information.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

The flexible manner of using a virtual cell identifier in CoMP communication may be preserved while enhancing operation of the user equipment, e.g. for network-assisted interference cancellation and suppression or power optimization, by providing user equipment with at least one virtual cell identifier and corresponding state information for at least one neighboring cell. The state information indicates one of a plurality of states that indicate whether the virtual cell identifier is associated with at least one non-virtual reference signal. In some embodiments, the plurality of states includes a first state that indicates that the corresponding virtual cell identifier is associated with at least one non-virtual reference signal for a cell, a second state that indicates that the corresponding virtual cell identifier is associated with a plurality of non-virtual reference signals for a plurality of cells, and a third state that does not indicate an association between the virtual cell identifier and a non-virtual reference signal. Information identifying one or more non-virtual reference signals may be transmitted with the virtual cell identifier and state information when the state information indicates the first state for the virtual cell identifier. The user equipment may then use a virtual reference signal derived from the virtual cell identifier and the identified non-virtual reference signals to demodulate interfering signals transmitted using the virtual cell identifier. When the state information indicates the second state, the user equipment may select the non-virtual reference signals associated with one of the cells for demodulating interfering signals (in combination with the virtual reference signal derived from the virtual cell identifier) or blind decode based on the non-virtual reference signals associated with the plurality of cells and choose the best result for interference suppression or cancellation. When the state information indicates the third state, the user equipment may demodulate interfering signals based on the virtual reference signal derived from the virtual cell identifier. Thus, the behavior of the user equipment and the performance of the interference cancellation/suppression scheme depend on the state indicated by the state information received with the virtual cell identifier.

Figure 1:
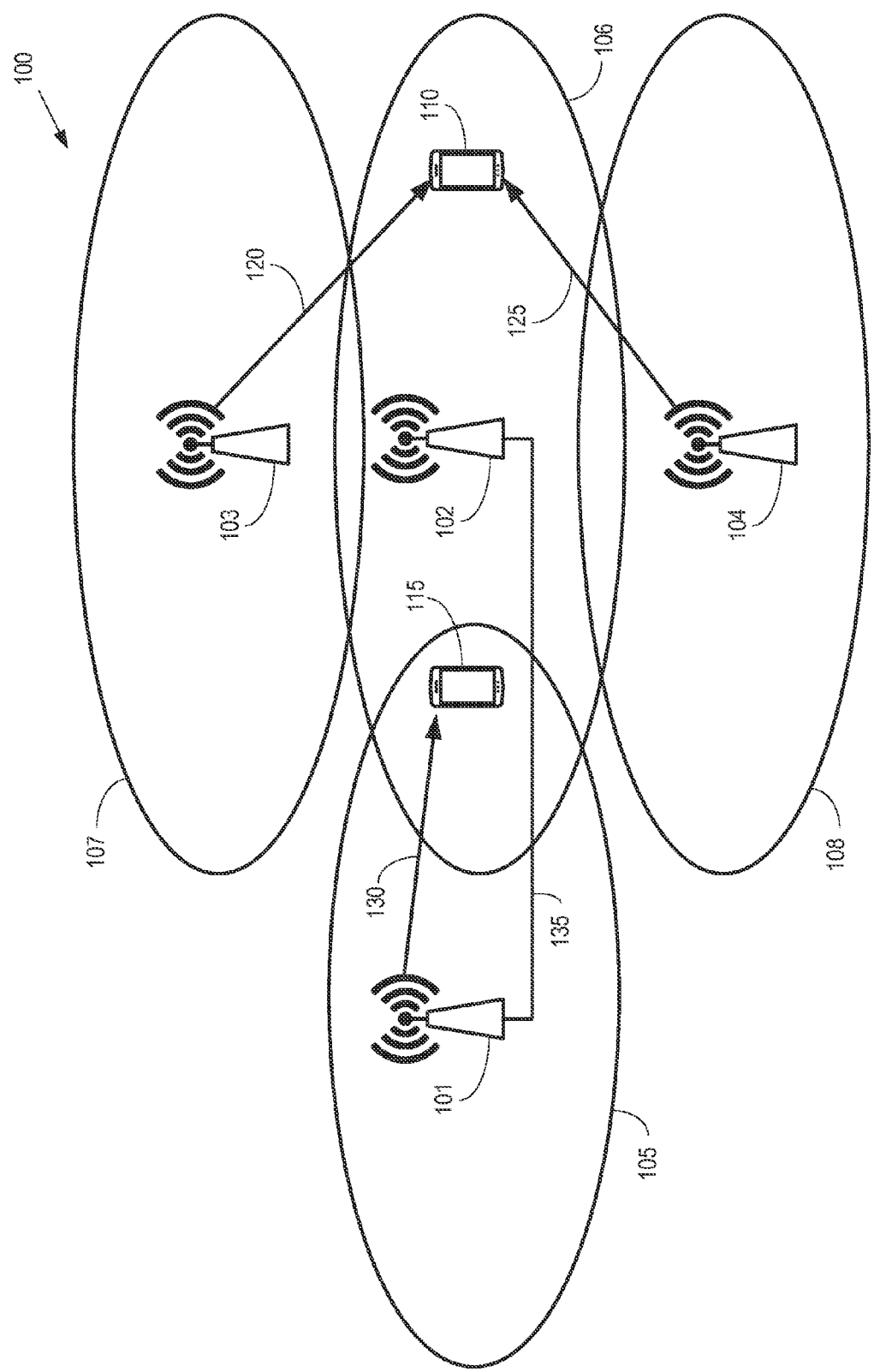
FIG. 1 is a diagram of a wireless communication system according to some embodiments.

FIG. 1 is a diagram of a wireless communication system 100 according to some embodiments. The wireless communication system 100 includes a plurality of base stations 101, 102, 103, 104 (collectively referred to as "the base stations 101-104") that provide wireless connectivity within a corresponding plurality of geographic areas 105, 106, 107, 108 (collectively referred to as "the geographic areas 105-108"). In accordance with common practice in the art, the base stations 101-104 and the geographic areas 105-108 may both be referred to as "cells." However, in the interest of clarity, the base stations 101-104 will be referred to as cells 101-104 and the geographic areas 105-108 will be referred to as the geographic areas 105-108. The cells 101-104 provide wireless connectivity to the user equipment 110, 115 within fully or partially overlapping geographic areas 105-108 and may therefore be referred to as being neighbors to each other.

The cells 101-104 are identified by physical cell identifiers that may be used to scramble transmitted information so that user equipment 110, 115 can distinguish between signals transmitted by different cells 101-104. For example, user equipment 110 can distinguish between downlink transmissions from the cell 103 over the air interface 120 and downlink transmissions from the cell 104 over the air interface 125 on the basis of the different physical cell identifiers of the cells 103 and 104. Some embodiments of the physical cell identifier have values that range from 0 to 503 and so the physical cell identifier may only be unique within a constrained geographical area and may not be globally unique. Downlink transmissions from the cells 101-104 include one or more reference signals that can be used by user equipment 110, 115 for channel estimation, decoding, demodulation, or other processes. Some embodiments of the reference signals include cell-specific reference signals (CRS) that are derived from the physical cell identifiers of the cells 101-104, channel state information reference signals (CSI-RS) that are configured by the cells 101-104, and demodulation reference signals (DMRS) that may be derived from the physical cell identifier.

Some embodiments of the cells 101-104 may support or participate in coordinated multipoint (CoMP) communication that allows more than one cell 101-104 to communicate with user equipment 110, 115 using a single identifier, which is referred to a herein as a virtual cell identifier. For example, the cells 102, 103 may both (either independently or concurrently) transmit downlink signals to the user equipment 110 using a first virtual cell identifier that is allocated to the cells 102, 103 and provided to the user equipment 110. For another example, the cells 101-103 may independently or concurrently transmit downlink signals to the user equipment 110 using a second virtual cell identifier that is allocated to the cells 101-103 and provided to the user equipment 110.

Downlink transmissions from the cells 101-104 may interfere with downlink transmissions from neighboring cells 101-104. For example, downlink transmissions from the cell 103 to user equipment 110 over the air interface 120 may interfere with downlink transmissions from the cell 101 to user equipment 115 over the air interface 130. For another example, downlink transmissions from the cell 104 to user equipment 110 over the air interface 125 may interfere with the downlink transmissions from the cell 101 to the user equipment 115 over the air interface 130. Some embodiments of the user equipment 115 may therefore perform interference cancellation or suppression of the interfering signals. For example, the user equipment 115 may be aware of the reference signals used by neighboring cells 101-104 to transmit downlink signals toward user equipment 110, 115. The user equipment 115 may perform channel estimation for the signals transmitted towards the user equipment 110 based on the reference signals. The user equipment 115 may then decode or demodulate the interfering signals transmitted by neighboring cells 101-104 based on the channel estimate and other information such as a power offset of the data and the reference signals, a type of transmission, and the like. After decoding or demodulating signal, the user equipment 115 encodes or re-modulates the interfering signal and subtracts the interfering signal from the received signal.

In CoMP, some of the reference signals used by the cells 101-104 may be derived from the virtual cell identifiers. For example, a subset of the cells 101-104 that use the same virtual cell identifier for CoMP downlink transmissions may derive the same DMRS from their shared virtual cell identifier, e.g., using the derivation procedure for deriving a DMRS from a physical cell identifier. Reference signals, such as the DMRS, that can be derived from a virtual cell identifier are referred to herein as "virtual reference signals." Other reference signals used by the cells 101-104 are not derived from virtual cell identifiers. For example, cell-specific reference signals (CRS) are derived from the physical cell identifiers of the cells 101-104 and are not derived from virtual cell identifiers. For another example, the cells 101-104 may configure channel state information reference signals (CSI-RS) by selecting one of a plurality of predetermined CSI-RS configurations. Reference signals that are not derived from virtual cell identifiers are referred to herein as "non-virtual reference signals."

A backhaul interface 135 between the cell 101 and the cell 102 may be used to convey information identifying some or all of the reference signals used by the cells 102-104 to the cell 101. However, as discussed herein, the reference signals used by the cells 101-104 during CoMP may change in each subframe and timing delays over the backhaul interface 135 make it impractical to transmit information identifying both the virtual and non-virtual reference signals over the backhaul interface 135 for every subframe. Although a backhaul interface 135 is shown between the cell 101 and the cell 102, some embodiments of the wireless communication system 100 may use a single entity such as a baseband unit (not shown in FIG. 1) to control multiple cells or transmission points during CoMP. Information identifying virtual or non-virtual reference signals for multiple cells or transmission points may therefore be transmitted over an internal interface, e.g., in the baseband unit.

Instead of transmitting information identifying all the virtual and non-virtual reference signals being used by the cells 101-104 in every subframe, neighboring cells 101-104 may exchange information over one or more backhaul interfaces (or internal interfaces) indicating virtual cell identifiers and corresponding state information. For example, the cells 101, 102 may exchange virtual cell identifiers and state information over the backhaul interface 135 during configuration of the wireless communication system 100 or in response to changes in a neighbor list maintained by the wireless communication system 100. The state information indicates one of a plurality of states that indicate whether the virtual cell identifier is associated with one or more non-virtual reference signals. In some embodiments, the plurality of states includes a first state, a second state, and a third state. However, the plurality of states may include more or fewer states and may include any combination of the first state the second state, and the third state.

The first state (or state 1) indicates that the corresponding virtual cell identifier is associated with one or more non-virtual reference signals for one of the cells 101-104. For example, the first state indicates that the virtual cell identifier is associated with a CSI-RS and a CRS for one of the cells 101-104. The first state may also indicate whether cells using the virtual cell identifier are co-located with a serving cell of the interfering user equipment or a serving cell of the victim user equipment. As used herein, the term "co-located" will be understood to mean that the properties of the radio propagation paths or Doppler shifts associated with the co-located cells are similar to a degree that allows user equipment to estimate channels to the co-located cells based on non-virtual reference signals transmitted by any of the co-located cells. Co-located cells may also partially or fully overlap each other. For example, the first state (or state 1a) may indicate that the victim user equipment 115 can assume that cells using the virtual cell identifier are not co-located to the serving cell 102 of the interfering user equipment 110 or the serving cell 101 of the victim user equipment 115. For another example, the first state (or state 1b) may indicate that the victim user equipment 115 can assume that cells using the virtual cell identifier are co-located to the serving cell 101 of the victim user equipment 115. For yet another example, the first state (or state 1c) may indicate that the victim user equipment 115 can assume that cells using the virtual cell identifier are co-located to the serving cell 102 of the interfering user equipment 110. In some embodiments, information identifying the non-virtual reference signals may also be transmitted with the virtual cell identifier and the state information in the first state.

The second state (or state 2) indicates that the corresponding virtual cell identifier is associated with a plurality of non-virtual reference signals for more than one of the cells 101-104. For example, the second state may indicate that the virtual cell identifier is associated with non-virtual reference signals for the cells 102, 104. User equipment 110, 115 may therefore use different approaches to determine which non-virtual reference signals to use for interference cancellation or suppression. Some embodiments of the user equipment 110, 115 may select the non-virtual reference signals associated with one of the cells 102, 104 for interference cancellation or suppression. Some embodiments of the user equipment 110, 115 may blind decode signals received from the cells 102, 104 and then select the cell 102, 104 that provides the best result for interference cancellation or suppression.

The third state (or state 3) does not indicate an association between the virtual cell identifier and a non-virtual reference signal. In response to receiving state information indicating the third state, user equipment 110, 115 cannot assume that any particular non-virtual reference signals can be used for interference cancellation or suppression. The user equipment 110, 115 may therefore use the virtual reference signals derived from the virtual cell identifier to perform interference cancellation or suppression. The user equipment 110, 115 may also choose not to perform interference cancellation or suppression in response to receiving state information indicating the third state.

In some embodiments, the state associated with the virtual cell identifier may be chosen based upon the information that is being transmitted to the user equipment 115. For example, the user equipment 110 may be able to effectively cancel or suppress interference from downlink transmissions to the user equipment 115 using the virtual reference signals derived from the virtual cell identifier (such as the DMRS) if the downlink transmissions occupy three or more physical resource blocks of the downlink subframe. However, the user equipment 110 may not be able to effectively cancel or suppress interference using the virtual reference signals if the downlink transmissions to the user equipment 115 occupy less than three physical resource blocks of the downlink subframe. The third state may therefore be used for downlink transmissions that are larger than three physical resource blocks and the first state may be used for downlink transmissions that are smaller than three physical resource blocks of the downlink subframe.

The cells 101-104 may provide the virtual cell identifier, the state information, and (optionally) information identifying one or more of the non-virtual reference signals to the user equipment 110, 115. For example, the cell 101 may provide a message including one or more virtual cell identifiers, corresponding state information, and (optionally) information identifying one or more non-virtual reference signals to the user equipment 115 over the air interface 130 in response to the user equipment 115 connecting to the cell 101. In some embodiments, the cell 101 may not provide the message immediately after the user equipment 115 connects, but may instead wait for a determination that the user equipment 115 is sufficiently close to a neighboring cell to warrant performing interference cancellation or suppression for the neighboring cell. The user equipment 115 may then use the provided information for interference cancellation or suppression. For example, the user equipment 115 may use the provided information to cancel or suppress interference generated by transmissions over the air interfaces 120, 125 using virtual cell identifiers.

Table 1 is an example of a set of virtual cell identifiers (VCIDs) and corresponding state information. In this example, user equipment 115 identifies the cell 102 as the strongest interferer and attempts to cancel or suppress downlink signals transmitted towards the user equipment 110 in the cell 102. The interfering cell 102 is operating under CoMP with cells 103, 104. Cell 104 is co-located to cell 102 and cell 103 is not co-located to cell 102. The virtual cell identifiers and co-location information can therefore be signaled from cell 102 to cell 101 over the backhaul interface 135 according to the associations in Table 1.

The state information in Table 1 indicates that the VCID 20 has a fixed association with the non-virtual reference signals (CSI-RS, CRS) corresponding to cell 103. Thus, the state information indicates state 1a, as discussed herein. Information identifying the non-virtual reference signals corresponding to cell 103 may also be transmitted with the VCID 20 and the state information. The VCID 20 can only be used by cell 103 during CoMP operation of the cells 101-104. The user equipment 115 may therefore perform interference cancellation or suppression using the non-virtual reference signals corresponding to cell 103 if the cell 103 transmits to user equipment 110 in cell 102 using VCID 20.

TABLE 1

| VCID | State |
|---|---|
| 20 | CSI-RS or CRS corresponding to Cell 103 (i.e. State 1a) |
| 30 | CSI-RS or CRS corresponding to Cell 102 (i.e. State 1c) |
| 40 | CSI-RS or CRS corresponding to Cell 101 (i.e. State 1b) |
| 50 | State 3 (or NULL) |
| 60 | CSI-RS/RS corresponding to Cells 102, 104 (i.e. State 2) |

The VCID 30 is shared by the cell 102 and the cell 104. The state information indicates that the VCID 30 has a fixed association with the non-virtual reference signals associated with cell 102, which is the serving cell for the user equipment 110. Thus, the state information indicates state 1c, as discussed herein. Information identifying the non-virtual reference signals corresponding to cell 102 may also be transmitted with the VCID 30 and the state information. The cells 102, 104 may use the VCID 30 for downlink transmission to user equipment 115 because cell 104 is co-located to cell 102. The user equipment 115 can use the non-virtual reference signals of cell 102 (or cell 104) for interference cancellation or suppression of downlink signals transmitted from the cells 102, 104 to user equipment 115.

The VCID 40 is used by cells that are co-located to cell 101, which is the serving cell of the user equipment 115. Thus, the state information indicates state 1b, as discussed herein. Information identifying the non-virtual reference signals corresponding to cell 101 may also be transmitted with the VCID 40 and the state information. The non-virtual reference signals for cell 101 may be used for interference cancellation or suppression. For example, user equipment 115 may use the non-virtual reference signals for cell 101 for interference suppression or cancellation of interference generated by the cell 101, e.g., due to multi-user transmission by the cell 101 to the user equipment 115 and one or more other user equipment.

The VCID 50 does not indicate any restrictions or linkage between the non-virtual reference signals for the cells 101-104. Thus, the state information indicates state 3, which may also be referred to as the NULL state, as discussed herein. User equipment 115 cannot make any assumptions about co-location of any of the cells 101-104 and consequently may only perform interference cancellation or suppression on the basis of virtual reference signals, such as the DMRS. For example, the VCID 50 can be used for joint (e.g., concurrent or synchronized) CoMP transmission from cell 102 and cell 103 to user equipment 110. The user equipment 115 may not incorporate any non-virtual reference signals in the interference cancellation or suppression and may perform the interference cancellation or suppression based only on the DMRS derived from VCID 50. The VCID 50 may also be used as a common virtual cell identifier for cells 102, 103, 104 while the user equipment 110 is receiving downlink signals from different cells 102, 103, 104 during successive subframes.

The VCID 60 indicates that the non-virtual reference signals for cell 102 and cell 104 may be used for interference cancellation or suppression. Thus, the state information indicates state 2, as discussed herein. The user equipment 115 may therefore choose an association to either cell 102 or cell 104. The user equipment 115 may also blind decode cells 102, 104 and choose the one that produces the best result for interference cancellation or suppression. Both cells 102, 104 can therefore use the VCID 60 for transmission to the user equipment 110 in the cell 102.

Although some embodiments of the user equipment 110, 115 may use the VCID and state information, as well as other information conveyed with the VCID, for interference suppression or cancellation, some embodiments of the user equipment 110, 115 may modify their operation in other ways based on the provided VCID and state information, as well as other information conveyed with the VCID, For example, user equipment 110, 115 may modify their operation to configure power optimization parameters based on the VCID or state information.

Figure 2:
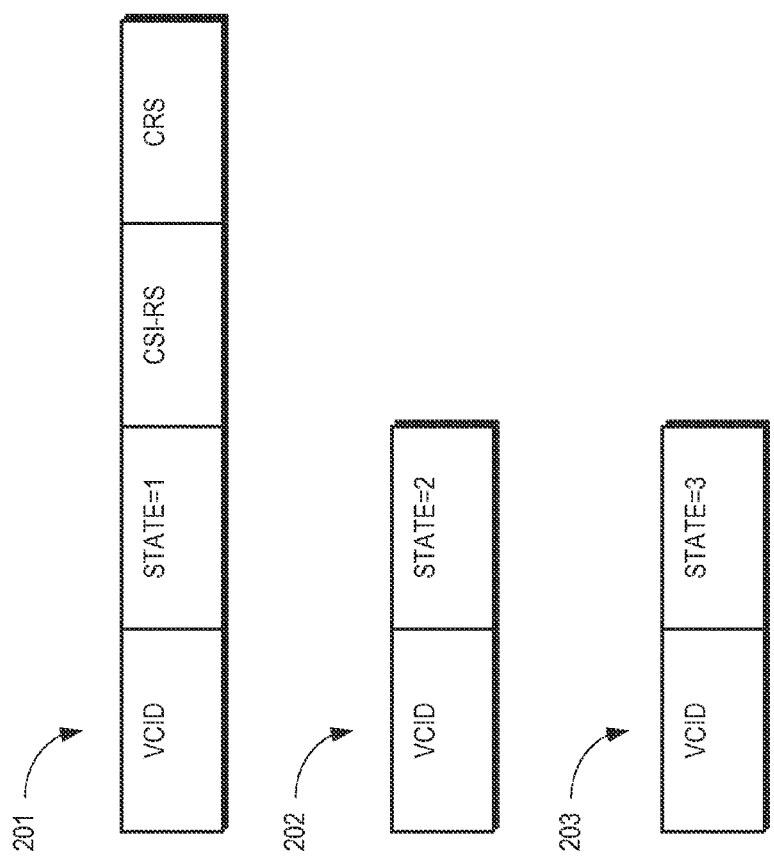
FIG. 2 is a diagram of messages for transmitting virtual cell identifiers and state information over an interface according to some embodiments.

FIG. 2 is a block diagram of messages 201, 202, 203 for transmitting virtual cell identifiers and state information over an interface according to some embodiments. Some embodiments of the message may be transmitted over an internal interface or a backhaul interface, as discussed herein. The message 201 includes fields for transmitting information indicating the virtual cell identifier (VCID) and corresponding state information that indicates that the virtual cell identifier is associated with the first state (STATE=1). In state 1, the virtual cell identifier is uniquely associated with non-virtual reference signals for one cell. Some embodiments of the message 201 therefore include information identifying the non-virtual reference signals (CSI-RS and CRS) for the cell associated with the virtual cell identifier. The message 202 includes fields for transmitting information indicating the virtual cell identifier (VCID) and corresponding state information that indicates that the virtual cell identifier is associated with the second state (STATE=2). In-state 2, the virtual cell identifier is associated with non-virtual reference signals for multiple cells. Some embodiments of the message 202 may therefore include information identifying the multiple cells or the non-virtual reference signals used by the multiple cells, e.g., for blind decoding of the multiple cells. The message 203 includes fields for transmitting information indicating the virtual cell identifier (VCID) and corresponding state information that indicates that the virtual cell identifier is associated with the third state (STATE=3). In-state 3, the virtual cell identifier is not associated with non-virtual reference signals for any cells and therefore no information identifying non-virtual reference signals is transmitted in message 203.

Figure 3:
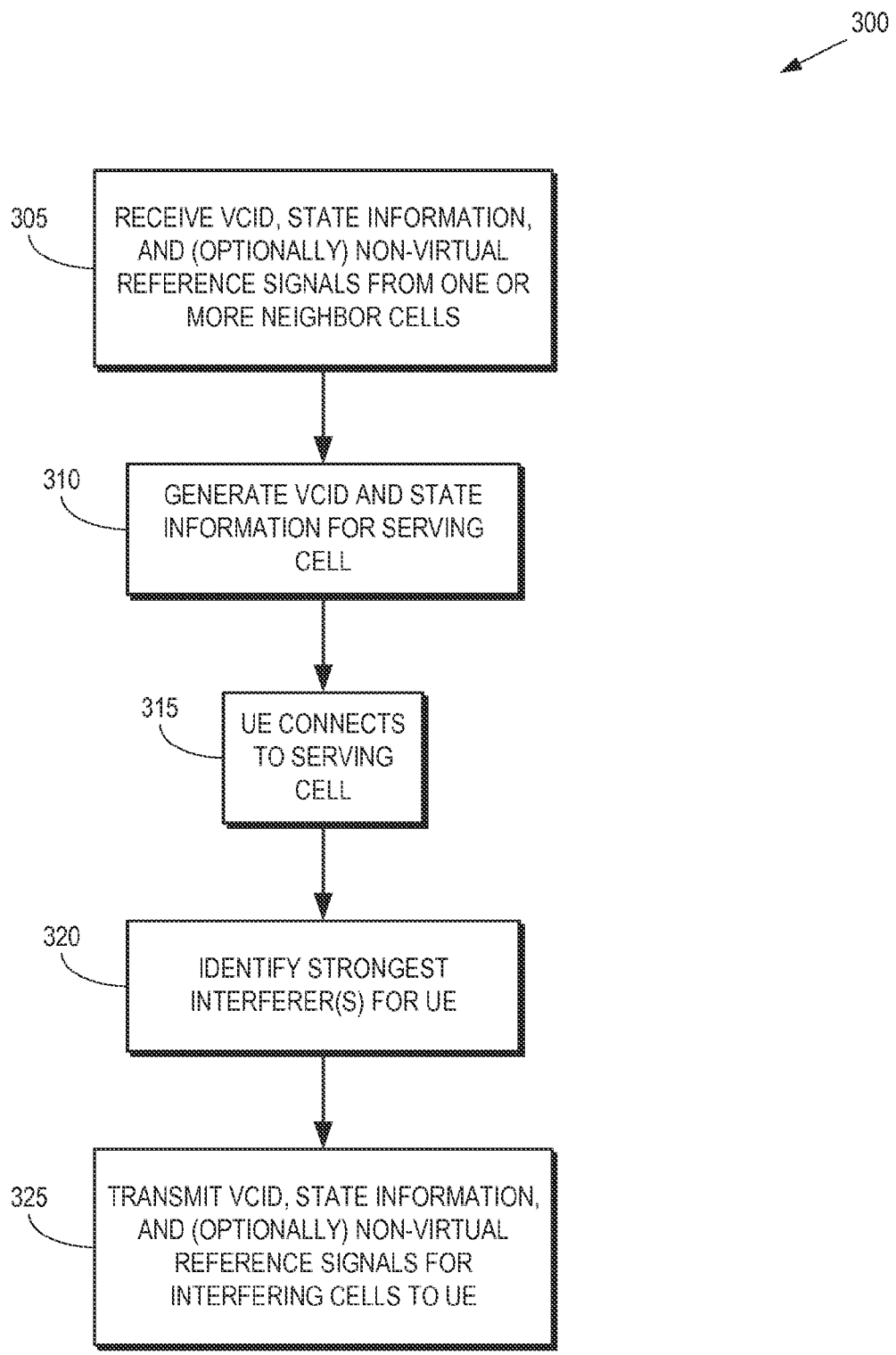
FIG. 3 is a flow diagram of a method for providing virtual cell identifiers and state information to user equipment according to some embodiments.

FIG. 3 is a flow diagram of a method 300 for providing virtual cell identifiers and state information to user equipment according to some embodiments. The method 300 may be implemented in embodiments of the wireless communication system 100 shown in FIG. 1. At block 305, a serving cell for user equipment receives a message including information indicating one or more virtual cell identifiers and corresponding state information from one or more neighbor cells. The message may optionally include information identifying the non-virtual reference signals used by one or more of the neighbor cells for downlink transmissions. The message may be received over internal or backhaul interfaces between the serving cell and the one or more neighbor cells. At block 310, the serving cell may generate virtual cell identifiers and state information associated with downlink transmissions by the serving cell, e.g., for use in interference cancellation or suppression of multi-user signals transmitted by the serving cell.

At block 315, user equipment connects to the serving cell. At block 320, the user equipment identifies one or more strongest interferers from among the neighboring cells. The user equipment may transmit a message identifying the strongest interferers to the serving cell. At block 325, the serving cell transmits a message including information indicating one or more virtual cell identifiers and corresponding state information for the interfering cells. The message may optionally include information identifying the non-virtual reference signals used by the interfering cells for downlink transmissions.

Figure 4:
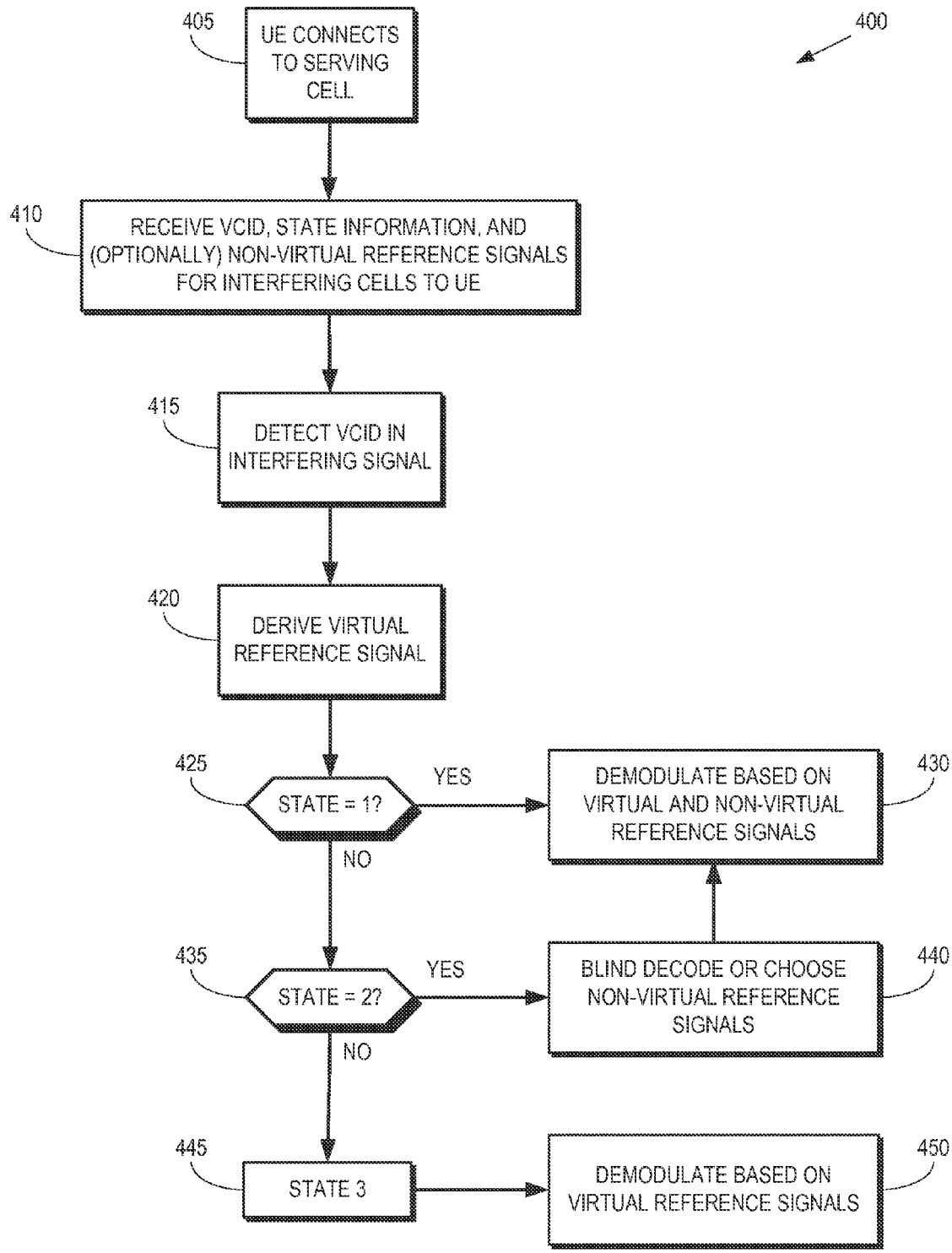
FIG. 4 is a flow diagram of a method for performing interference cancellation or suppression based on virtual cell identifiers and state information according to some embodiments.

FIG. 4 is a flow diagram of a method 400 for performing interference cancellation or suppression based on virtual cell identifiers and state information according to some embodiments. The method 400 may be implemented in embodiments of the wireless communication system 100 shown in FIG. 1. At block 405, user equipment attaches to a serving cell. At block 410, the serving cell transmits a message including information indicating one or more virtual cell identifiers and corresponding state information for one or more interfering cells. The message may optionally include information identifying the non-virtual reference signals used by the interfering cells for downlink transmissions. At block 415, the user equipment detects interfering signals transmitted using one of the virtual cell identifiers received from the serving cell. At block 420, the user equipment uses the virtual cell identifier to derive a virtual reference signal, such as a DMRS, for the interfering cell.

The state information is then used to determine whether the virtual cell identifier is associated with one or more non-virtual reference signals. At decision block 425, the user equipment determines whether the state information indicates that the virtual cell identifier is associated with state 1. If so, the virtual cell identifier is associated with non-virtual reference signals for one cell and the user equipment can identify the non-virtual reference signals. The user equipment may then decode or demodulate (at block 430) the interfering signals based on the virtual and non-virtual reference signals. If the state information does not indicate state 1, the user equipment determines (at decision block 435) whether the state information indicates that the virtual cell identifier is associated with state 2. If so, the virtual cell identifier is associated with non-virtual reference signals for a plurality of cells and the user equipment may blind decode the cells or choose one of the cells (at block 440) to identify the non-virtual reference signals. The user equipment may then decode or demodulate (at block 430) the interfering signals based on the virtual and non-virtual reference signals. If the state information does not indicate state 2, the state information indicates state 3 at block 445 and the virtual cell identifier is not associated with any non-virtual reference signals. The user equipment may then decode or demodulate (at block 450) the interfering signals based on the virtual reference signals.

Figure 5:
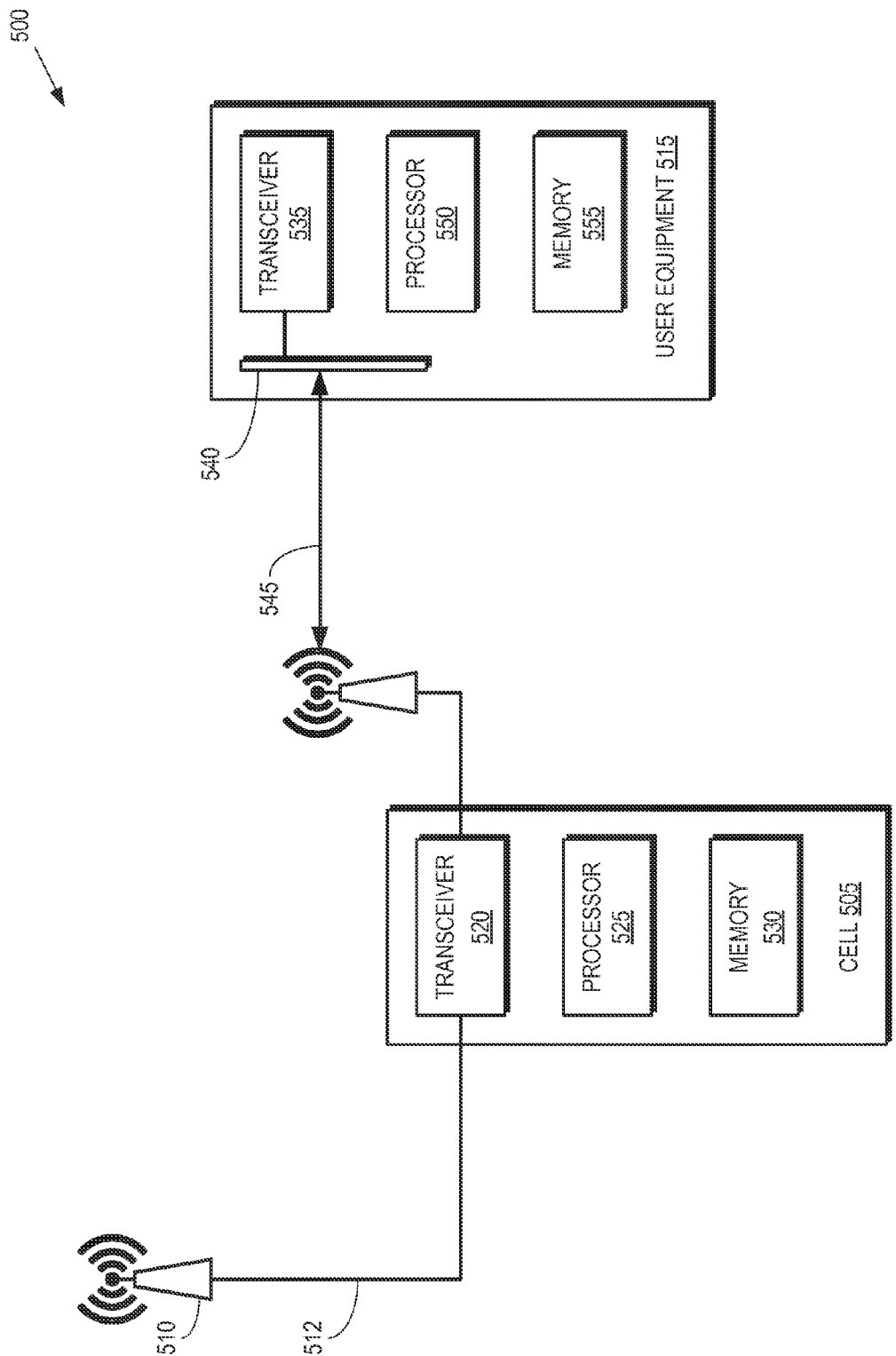
FIG. 5 is a diagram of a wireless communication system according to some embodiments.

FIG. 5 is a block diagram of a wireless communication system 500 according to some embodiments. The wireless communication system 500 includes a cell 505, a cell 510, and user equipment 515. Some embodiments of the cell 505, the cell 510, and the user equipment 515 may be used to implement the cells 101-104 and the user equipment 110, 115 shown in FIG. 1.

The cell 505 includes a transceiver 520 for transmitting or receiving messages, such as messages received from the cell 510 over a backhaul interface 512 or messages transmitted to the user equipment 515 over an air interface 545. The transceiver 520 may therefore support wired or wireless communication. However, as discussed herein, some embodiments of the cells 505, 510 may exchange messages over an internal interface such as an interface in a baseband unit that controls the cells 505, 510. The cell 505 also includes a processor 525 and a memory 530. The processor 525 may be used to execute instructions stored in the memory 530 and to store information in the memory 530 such as the results of the executed instructions. Some embodiments of the transceiver 520, the processor 525, or the memory 530 may be used to implement embodiments of the techniques described herein including the method 300 shown in FIG. 3 or the method 400 shown in FIG. 4.

The user equipment 515 includes a transceiver 535 that is coupled to an antenna 540 for transmitting or receiving messages over the air interface 545, such as messages transmitted by the cell 505. The transceiver 535 may therefore support wired or wireless communication. The user equipment 515 also includes a processor 550 and a memory 555. The processor 550 may be used to execute instructions stored in the memory 555 and to store information in the memory 555 such as the results of the executed instructions. Some embodiments of the transceiver 535, the processor 550, or the memory 555 may be used to implement embodiments of the techniques described herein including the method 300 shown in FIG. 3 or the method 400 shown in FIG. 4.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectro-mechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
   selecting state information associated with a virtual cell identifier to indicate a first state in response to the virtual cell identifier being associated with a non-virtual reference signal, a second state in response to the virtual cell identifier being associated with a plurality of non-virtual reference signals used by a plurality of cells, or a third state in response to the virtual cell identifier not being associated with the at least one non-virtual reference signal; and
   transmitting a message including the virtual cell identifier and the state information associated with the virtual cell identifier over an interface from a first cell to a second cell, wherein the first cell and at least one third cell share the virtual cell identifier.

2. The method of claim 1, wherein transmitting the message including the virtual cell identifier and the state information comprises transmitting state information indicating the first state and further indicating that the cells using the virtual cell identifier are co-located to a serving cell of an interfering user equipment.

3. The method of claim 1, wherein transmitting the state information comprises transmitting state information indicating the first state and further indicating that the non-virtual reference signal is used by a cell that is not co-located with the first cell or the second cell.

4. The method of claim 1, wherein transmitting the state information comprises transmitting state information indicating the first state and further indicating that the non-virtual reference signal is used by a cell that is co-located with at least one of the first cell and the second cell.

5. The method of claim 1, wherein the message also includes information identifying the non-virtual reference signal on the condition that the state information indicates the first state.

6. The method of claim 1, wherein selecting the state information comprises selecting the state information based on information to be transmitted to user equipment using the virtual cell identifier.

7. The method of claim 6, wherein selecting the state information comprises selecting the first state for downlink transmissions to the user equipment that are smaller than a specified number of physical resource blocks of a downlink subframe and selecting the third state for downlink transmissions to the users equipment that are larger than or equal to the specified number of physical resource blocks of the downlink subframe.

8. A method comprising:
receiving, from a first cell at a second cell over an interface, a first message including a virtual cell identifier and state information associated with the virtual cell identifier, wherein the first cell and at least one third cell share the virtual cell identifier for transmissions to first user equipment, and wherein the state information is selected to indicate a first state in response to the virtual cell identifier being associated with a non-virtual reference signal, a second state in response to the virtual cell identifier being associated with a plurality of non-virtual reference signals used by a plurality of cells, or a third state in response to the virtual cell identifier not being associated with the at least one non-virtual reference signal; and
transmitting a second message including the virtual cell identifier and state information over an air interface to second user equipment served by the second cell.

9. The method of claim 8, wherein receiving the first message including the virtual cell identifier and the state information comprises receiving state information indicating the first state and further indicating that the cells using the virtual cell identifier are co-located to a serving cell of an interfering user equipment.

10. The method of claim 8, wherein receiving the state information comprises receiving state information indicating the first state and further indicating that the non-virtual reference signal is used by a cell that is not co-located with the first cell or the second cell.

11. The method of claim 8, wherein receiving the state information comprises receiving state information indicating the first state and further indicating that the non-virtual reference signal is used by a cell that is co-located with at least one of the first cell and the second cell.

12. The method of claim 9, wherein the first message also includes information identifying the non-virtual reference signal on the condition that the state information indicates the first state.

13. The method of claim 9, wherein the state information is selected based on information to be transmitted to the user equipment using the virtual cell identifier.

14. The method of claim 13, wherein the first state is selected for downlink transmissions to the user equipment that are smaller than a specified number of physical resource blocks of a downlink subframe and the third state is selected for downlink transmissions to the user equipment that are larger than or equal to the specified number of physical resource blocks of the downlink subframe.

15. The method of claim 9, wherein transmitting the second message including the virtual cell identifier and state information comprises transmitting the second message including the virtual cell identifier and state information in response to the second user equipment connecting to the second cell.

16. A first cell comprising:
a processor configured to select state information associated with a virtual cell identifier to indicate a first state in response to the virtual cell identifier being associated with a non-virtual reference signal, a second state in response to the virtual cell identifier being associated with a plurality of non-virtual reference signals used by a plurality of cells, or a third state in response to the virtual cell identifier not being associated with the at least one non-virtual reference signal; and
a transceiver configured to transmit a message including the virtual cell identifier and the state information associated with the virtual cell identifier over an interface to a second cell, wherein the first cell and at least one third cell share the virtual cell identifier.

17. The first cell of claim 16, wherein the transceiver is configured to transmit state information indicating the first state and further indicating that cells using the virtual cell identifier are co-located to a serving cell of an interfering user equipment.

18. The first cell of claim 16, wherein the transceiver is configured to transmit state information indicating the first state and further indicating that the non-virtual reference signal is used by a cell that is not co-located with the first cell or the second cell.

19. The first cell of claim 16, wherein the transceiver is configured to transmit state information indicating the first state and further indicating that the non-virtual reference signal is used by a cell that is co-located with at least one of the first cell and the second cell.

20. The first cell of claim 16, wherein the message also includes information identifying the non-virtual reference signal on the condition that the state information indicates the first state.

21. The first cell of claim 16, wherein the processor is configured to select the first state for downlink transmissions that are smaller than a specified number of physical resource blocks of a downlink subframe, and wherein the processor is configured to select the third state for downlink transmissions that are larger than or equal to the specified number of physical resource blocks of the downlink subframe.

22. A first user equipment, comprising:
a transceiver configured to receive, from a first cell over an air interface, a message including a virtual cell identifier and state information associated with the virtual cell identifier, wherein a second cell and at least one third cell share the virtual cell identifier for transmissions to a second user equipment, and wherein the state information is selected to indicate a first state in response to the virtual cell identifier being associated with at least one non-virtual reference signal, a second state in response to the virtual cell identifier being associated with a plurality of non-virtual reference signals used by a plurality of cells, or a third state in response to the virtual cell identifier not being associated with the at least one non-virtual reference signal; and
a processor configured to modify operation of the first user equipment based on the virtual cell identifier and the state information.

23. The first user equipment of claim 22, wherein the processor is configured to perform interference cancellation or suppression based on a virtual reference signal derived from the virtual cell identifier and the at least one non-virtual reference signal.

24. The first user equipment of claim 22, wherein the transceiver is configured to receive state information indicating that the at least one non-virtual reference signal is used by a cell that is not co-located with the first cell or the second cell.

25. The first user equipment of claim 22, wherein the transceiver is configured to receive state information indicating that the at least one non-virtual reference signal is used by a cell that is co-located with at least one of the first cell and the second cell.

26. The first user equipment of claim 22, wherein the message also includes information identifying the at least one non-virtual reference signal.

27. The first user equipment of claim 22, wherein the processor is configured to blind decode the plurality of non-virtual reference signals or select at least one non-virtual reference signal used by one of the plurality of cells in response to the state information indicating the second state.

28. The first user equipment of claim 22, wherein the processor is configured to perform interference cancellation or suppression based on a virtual reference signal derived from the virtual cell identifier in response to the state information indicating the third state.

29. The first user equipment of claim 22, wherein the transceiver is configured to receive the virtual cell identifier and state information in response to the first user equipment attaching to the first cell.

30. The first user equipment of claim 22, wherein the processor is configured to perform at least one of interference cancellation or suppression of transmissions to the second user equipment.

31. The first user equipment of claim 22, wherein the processor is configured to perform power optimization based on the virtual cell identifier and the state information.

* * * * *